United States Patent [19]

Anderson

[11] Patent Number: 5,751,812
[45] Date of Patent: May 12, 1998

[54] RE-INITIALIZATION OF AN ITERATED HASH FUNCTION SECURE PASSWORD SYSTEM OVER AN INSECURE NETWORK CONNECTION

[75] Inventor: Milton M. Anderson, Fairhaven, N.J.

[73] Assignee: Bell Communications Research, Inc., Morristown, N.J.

[21] Appl. No.: 702,916

[22] Filed: Aug. 27, 1996

[51] Int. Cl.$^6$ ............................................. H04K 1/00
[52] U.S. Cl. ........................... 380/48; 380/25; 380/28; 380/21
[58] Field of Search ..................... 380/28, 21, 25, 380/48

[56] References Cited

U.S. PATENT DOCUMENTS

| | | | |
|---|---|---|---|
| 4,926,479 | 5/1990 | Goldwasser et al. | 380/23 |
| 5,454,039 | 9/1995 | Coppersmith et al. | 380/28 |
| 5,600,776 | 2/1997 | Johnson et al. | 395/326 |

*Primary Examiner*—David C. Cain
*Attorney, Agent, or Firm*—Joseph Giordano; Loria B. Yeadon

[57] ABSTRACT

Methods and apparatus are disclosed for re-initializing a secure password series based on an iterated hash function. User login information is communicated over an insecure network connection or other transmission medium between a client and a server. The server provides an indication that a first login series based on a first password has reached a predetermined minimum number of remaining hash function iterations. This indication could also be generated by the client. In either case, the client responds to the indication by generating an initialization signal which relates the first login series based on the first password to a second login series based on a second password. The initialization signal may be generated as the exclusive-or of the results of applying a first number of hash function iterations to the first password and a second number of hash function iterations to the second password. The client transmits the initialization signal to the server, which stores it along with an encrypted password transmitted in a previous valid first series login by the same user. The server then compares a function of the stored initialization signal and an initial second series login to the previously-stored first series login to determine if the initial second series login is valid. The second password may be generated by the client using a pass phrase portion of the first password and a new seed portion which does not require additional user input. The password re-initialization process can thus be performed automatically without any need to notify the user.

24 Claims, 3 Drawing Sheets

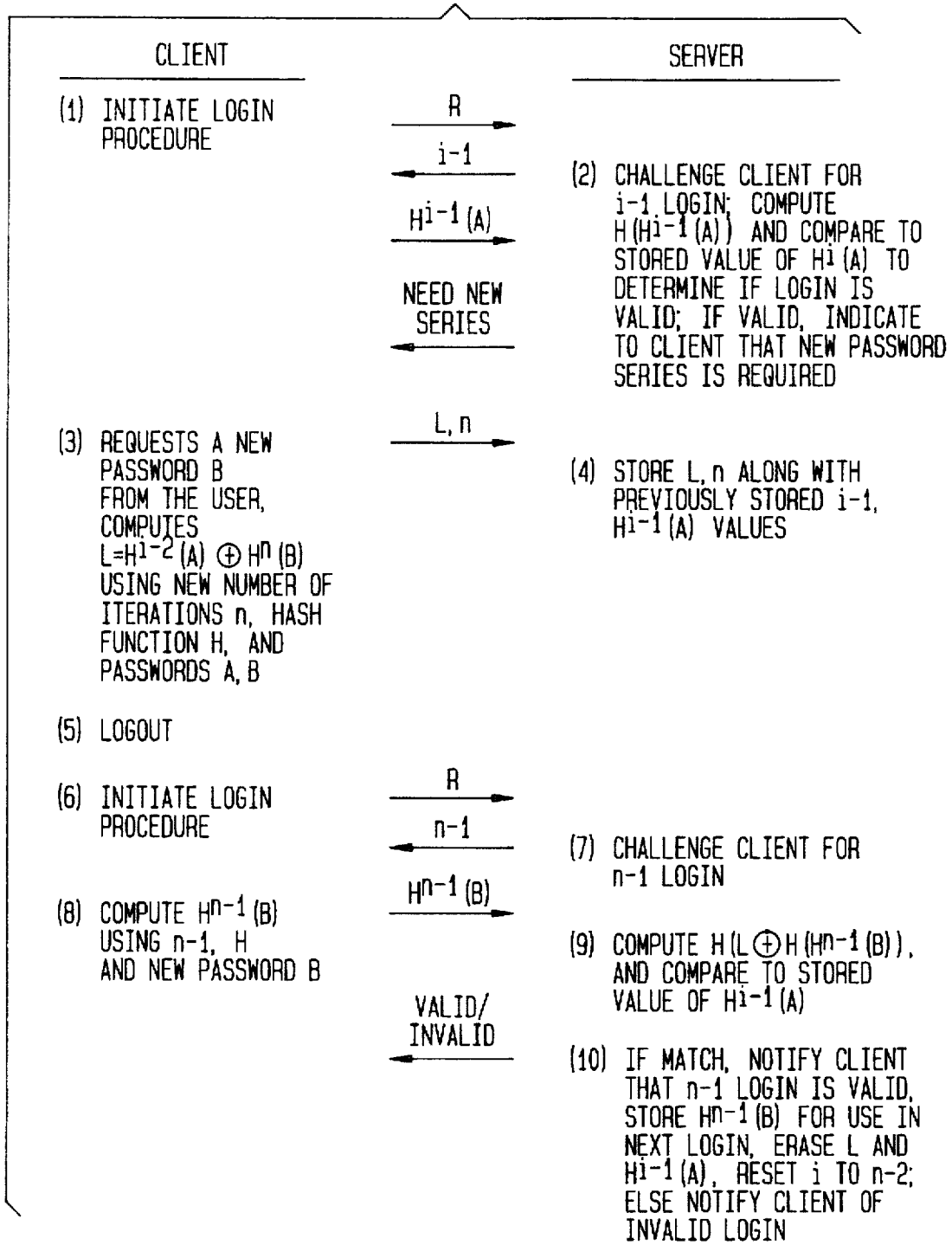

RE-INITIALIZATION OF AN ITERATED HASH FUNCTION SECURE PASSWORD SYSTEM OVER AN INSECURE NETWORK CONNECTION

FIELD OF THE INVENTION

The present invention relates generally to methods and apparatus for providing a secure communication over an insecure computer network connection or other transmission medium, and more particularly to secure password systems which utilize iterated hash functions and therefore require periodic re-initialization.

BACKGROUND OF THE INVENTION

Data security is an increasingly important aspect of communication via computer networks. Global networks such as the Internet are in large part insecure networks which rely on individual user encryption/decryption of data to provide security. In the many applications in which full encryption/decryption of all data is impractical or unnecessary, it is often desirable to provide a limited measure of security covering, for example, user-entered passwords, personal identification numbers (PINs), authenticators and other particularly sensitive data.

FIG. 1 illustrates an exemplary embodiment of a secure password system, referred to as the S/Key™ system, developed by Bell Communications Research (Bellcore) of Red Bank, N.J. FIG. 2A shows a portion of an exemplary computer network 10 in which the S/Key™ system may be implemented. The network 10 includes a number of clients 12-m, m=1, 2, ... M1 and a number of servers 14-m, m=1, 2, ... M2. The clients 12-1, 12-2 and 12-3 and server 14-1 are connected to a first local area network (LAN) segment 16, while clients 12-4, 12-5 and server 14-2 are connected to a second LAN segment 18. The LAN segments 16, 18 communicate via routers 20, 22, wide area network (WAN) interfaces 24, 26 and a public Internet 28. A given client 12-m initiates a login procedure to access a given server 14-m within the network 10. The S/Key™ system makes use of the following two general principles. The first principle is that there exists a cryptographically secure hash function H such that it is feasible to compute a hash value h from a password A, but it is infeasible to compute A from h. The hash value $h=H(A)$ can therefore be readily computed but the inverse operation $A=H^{-1}(h)$ is not readily computable using amounts of processing power and memory which might be available to an adversary. The second principle is that the hash function H can be iterated, such that $H^i(A)= H(H^{i-1}(A))$. Additional details regarding hash functions and secure password systems may be found in, for example, Neil Haller, "The S/KEY™ One-Time Password System," Proceedings of the ISOC Symposium on Network and Distributed System Security, February 1994, San Diego, Calif., and Leslie Lamport, "Password Authentication with Insecure Communication," Communications of the ACM 24.11, pages 770–772, November 1981, both of which are incorporated by reference herein.

As indicated in step (1) of FIG. 1, the client 12-m initiates the login procedure by sending a login request R to the server 14-m. The server 14-m responds in step (2) by challenging the client 12-m to provide a password for login $i-1$ of a login series for the corresponding user based on a seed S. It should be noted that the server has stored in memory a value of $H^i(A,S)$ obtained from either a previous valid login or a re-initialization procedure. The server 14-m also keeps track of the seed S and the number of logins by a given user and therefore knows the value of i which produced $H^i(A,S)$. In step (3), the client 12-m obtains password A from the user, computes an encrypted password $H^{i-1}(A,S)$ using the hash function H, and sends the encrypted password to the server 14-m. In step (4), the server computes $H(H^{i-1}(A,S))$ and compares the result to the above-noted previously-stored value $H^i(A,S)$. If a match is found, the server notifies the client that the current login is valid, stores $H^{i-1}(A,S)$ for use in the next login of the series, and decrements i by one, as shown in step (5). If there is no match, the client is notified that the current login is invalid. With each successive valid login of a given login series, the number i of remaining hash function iterations is reduced by one. When the number of remaining iterations is reduced to zero, the user is unable to achieve a secure login using the original password A.

After the number of hash function iterations has been reduced to zero or a predetermined minimum number, the user generally re-initializes another series of logins. The user may do this by transmitting the value $H^n(B,S)$ based on a new password B to the server 14-m over a secure communication channel. The value $H^n(B,S)$ is generated by combining the new password B with the seed S and hashing the result n times using the hash function H. The user also provides the server with the number of iterations n. The user may then begin a new series of n logins using the new password B. Alternatively, re-initialization could be implemented by changing the seed S to a new value T, with or without changing the previous password A.

Re-initialization generally requires a secure channel in order to prevent attackers from inserting false initialization messages which would allow them to initiate a login procedure as the user. This secure channel requirement may dictate that the re-initialization process be performed at the server site, or that the user take other actions which may be inconvenient, expensive or insufficiently secure. For example, if a given password series expires while the corresponding user is traveling, that user may be required to either re-initialize over an insecure network, stop logging on until a secure channel is available, or request that the server administrator re-initialize a new password series.

As is apparent from the above, a need exists for an improved secure password system which can be easily and securely re-initialized over an insecure network connection to thereby avoid the problems of the prior art.

SUMMARY OF THE INVENTION

The present invention provides methods and apparatus for performing secure password re-initialization over an insecure network connection or other insecure transmission medium. The invention in one embodiment allows a client to send to a server an initialization signal representing a link between a first login series based on a first password and a second login series based on a second password. The first and second passwords may each include a common pass phrase portion determined by the user and a distinct seed portion determined by the client without input from the user. The server may therefore automatically request that a client periodically re-initialize a secure password system by generating a new seed portion to be used with the common pass phrase portion. A given user is thus permitted to continue to use a particular pass phrase indefinitely, and need not even be aware that the re-initialization process is periodically taking place.

In accordance with one aspect of the invention, a method is provided which includes the steps of determining that a first series of communications based on a first password has reached a predetermined minimum number of remaining hash function iterations; generating an initialization signal relating the first series of communications based on the first password to a second series of communications to be based on a second password, wherein the initialization signal is generated as a function of the results of applying a first number of hash function iterations to the first password and a second number of hash function iterations to the second password; and transmitting the initialization signal over the insecure medium prior to commencing the second series of communications. The determination of whether the first series of communications has reached a predetermined number of remaining hash function iterations may be made by a server and communicated as an indication to a client. The client then generates the initialization signal in response to the indication received from the server. Alternatively, the client can make the determination as to whether the predetermined number of remaining hash function iterations has been reached.

The above-noted steps may be implemented in an exemplary embodiment in which a client communicates with a server via an insecure network connection to thereby allow a user associated with the client to login to the server. The client receives an indication from the server that a re-initialization is needed, and responds by providing the initialization signal which serves as a link between a first login series based on the first password and a second login series based on the second password. The server stores the initialization signal along with a previous login from the first series, and subsequently compares a function of the initialization signal and an initial second series login with the stored previous first series login to determine if the second series login is valid. The client and server may be any type of computers or other digital data processors which are suitably arranged to communicate secure passwords or other information over a network or other transmission medium. Once the user login is determined to be valid by the server, the user may access application programs, data or other services provided by the server.

Another aspect of the invention relates to the provision of an automatic re-initialization function which may be implemented by a client/server pair without the need for additional information from the user. The passwords of a given user are configured such that each password includes the same first portion, referred to herein as a pass phrase portion, and a distinct second portion, referred to herein as the seed portion. The server or the client generates a new seed portion in response to an indication that the number of remaining hash function iterations for a given login series has dropped below a predetermined minimum level. The new seed portion in combination with the common pass phrase portion represents a new password, which the client uses to generate an initialization signal for transmission to the server. The generation of the new seed and corresponding initialization signal may therefore be performed without the need for user input. This represents a significant improvement over conventional secure password systems in terms of re-initialization security and user convenience.

In accordance with another aspect of the invention, denial-of-service attacks, in which an attacker transmits counterfeit initialization signals to a server in an attempt to deny service to a legitimate user, may be counteracted by the user executing another first series login after transmission of an initialization signal. The user may thus utilize any remaining hash function iterations in the first series in the event that initialization of the second series is delayed or otherwise disrupted by a denial-of-service attack.

These and other advantages and features of the present invention will become more apparent from the accompanying drawings and the following detailed description.

BRIEF DESCRIPTION OF THE DRAWINGS

FIG. 3 is a diagram illustrating the operation of an exemplary secure password system with re-initialization in accordance with the present invention.

DETAILED DESCRIPTION OF THE PREFERRED EMBODIMENTS

The present invention will be illustrated below in conjunction with an exemplary client/server secure password generation process. It should be understood, however, that the present invention is not limited to any particular type of password or network application. For example, the invention may be utilized to protect any type of data, including personal identification numbers (PINS), authenticators, alarm codes or other sensitive communications, and in a wide variety of alternative data communication applications, including terminal emulators, Internet access software, and cable and telephone network applications. Although particularly advantageous when applied to password re-initialization over insecure networks, the invention may also be applied to secure networks or to non-network data communication devices. The term "client" as used herein should be understood to include any type of computer or other digital data processor suitable for directing data communication operations. The term "server" should be understood to include any computer or other digital data processor suitable for receiving and processing a secure communication from a client. The term "password" should be understood to include PINs, authentication codes or any other information identifying a particular user or group of users. A password or login "series" refers to a plurality of encrypted passwords or logins based on different numbers of hash iterations applied to a given password.

Figure 2A:
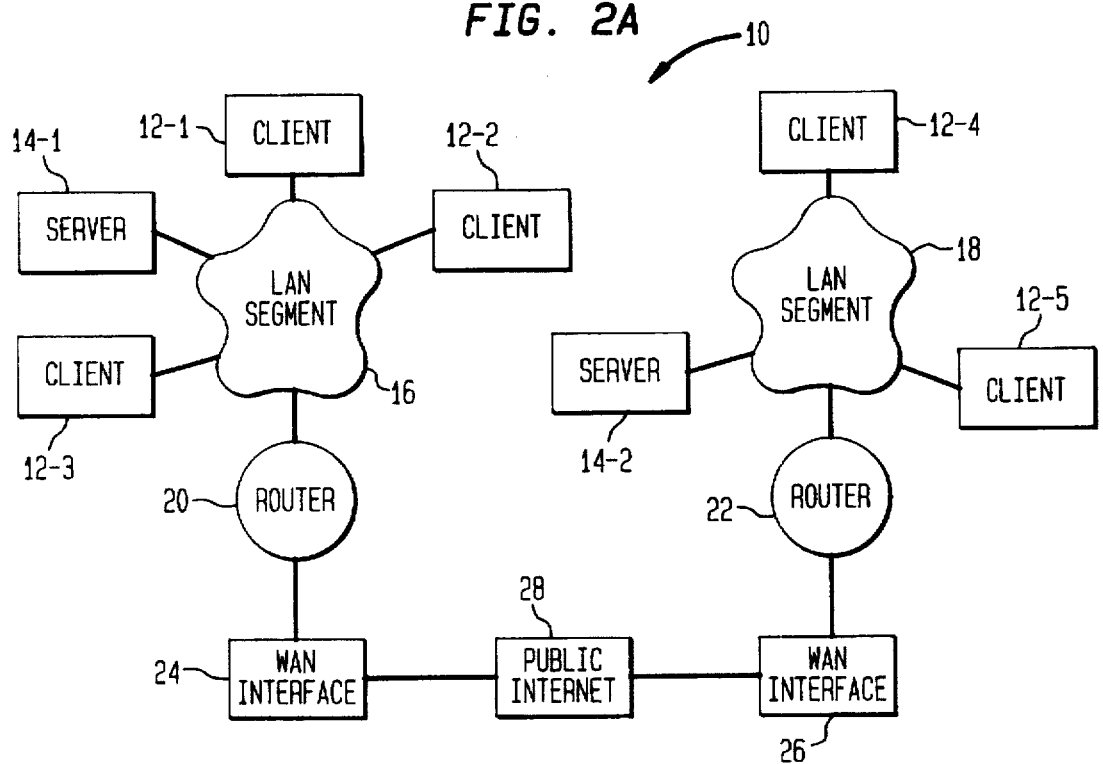
FIG. 2A is a block diagram of a computer network in which a secure password system in accordance with the invention may be implemented.

The present invention may be implemented in a computer network such as network 10 illustrated in FIG. 2A. As noted above, the exemplary network 10 includes a number of clients 12-m and servers 14-m which communicate with each other via local area network (LAN) segments 16, 18, routers 20, 22, wide area network (WAN) interfaces 24, 26 and a public Internet 28. For example, a given client 12-1 may login to server 14-1 in order to access application programs or other data or services available on the same LAN segment 16, or may login to server 14-2 via the public Internet 28 and other network elements to thereby access application programs or other data or services available on LAN segment 18. The exemplary servers 14-1 and 14-2 control the access of the given client to the servers and thus to portions of the network controlled by the servers. In order to access a given server, a client initializes a login procedure with that server. The login procedure generally requires a user associated with the client to enter a password, such that the password can be communicated over the network to the server, thereby enabling the server to verify that the user is authorized to access the server. It should be noted that the network is typically insecure, such that if the password is transmitted through the network in an unencrypted form, an eavesdropping attacker could retrieve the password and use it to subsequently login to the server. A given client/server pair will therefore implement a secure password technique, such as the above-described S/Key™ system, in which an encrypted password is generated by the client, transmitted over the insecure network, and authenticated by the server. The server has additional information which enables it to authenticate the encrypted password, but which is not useful to an attacker. An eavesdropping attacker has access to only the encrypted password, which cannot be readily decrypted to provide the actual password.

Figure 2B:
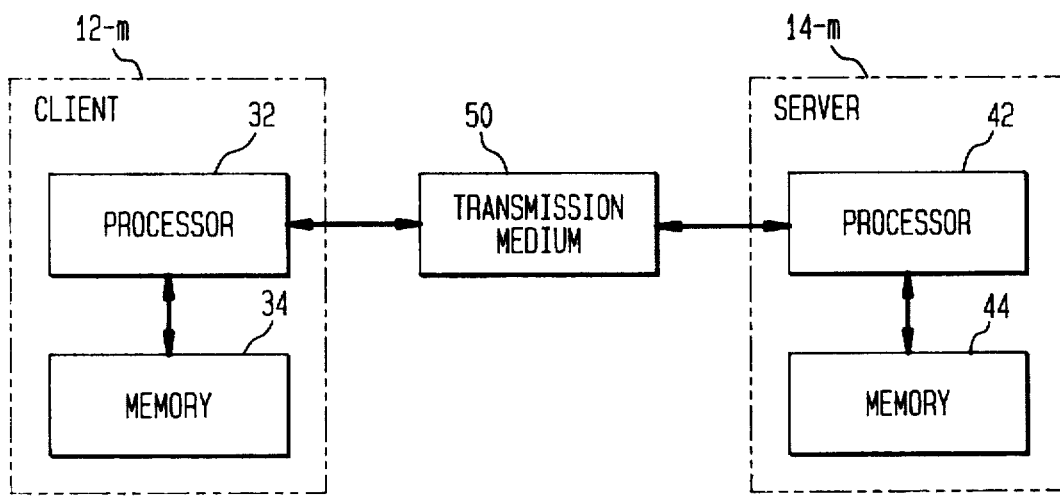
FIG. 2B is a block diagram illustrating in greater detail the structure of an exemplary client/server pair suitable for implementing a secure password system in accordance with the invention

FIG. 2B illustrates in greater detail the interaction of a particular client/server pair in a secure password system. The client 12-m includes a processor 32 and a memory 34, while the server 14-m includes a processor 42 and a memory 44. As noted above, client 12-m and server 14-m may be implemented as computers communicating over a transmission medium 50 which may include one or more elements of the exemplary network 10 of FIG. 2A. The processor 32 of client 12-m initiates a login procedure in a conventional manner which may involve the transmission of data to server 14-m via the medium 50. The processor 42 of server 14-m responds to a login request from client 12-m by executing portions of the login procedure, and utilizes memory 44 to store the additional information which it utilizes to verify the authenticity of an encrypted password transmitted by client 12-m.

FIG. 3 illustrates the operation of an exemplary secure password system with a re-initialization feature in accordance with one embodiment of the invention. A client 12-m initiates a login procedure in step (1) by sending a login request R to the server 14-m. The server 14-m has previously stored in memory 44 the value $H^i(A)$, which represents i applications of a hash function H to a user password A as generated during a previous login procedure. A number of different hash functions may be utilized with the present invention, including those described in the above-cited Haller and Lamport references, as well as other hash functions including MD5 and SHA, both of which are described in Schneier, Bruce; "Applied Cryptography," Second Edition, Chapter 18, pp. 436–445, 1996 John Wiley and Sons, ISBN 0-471-11709-9, which is incorporated herein by reference.

Figure 1:
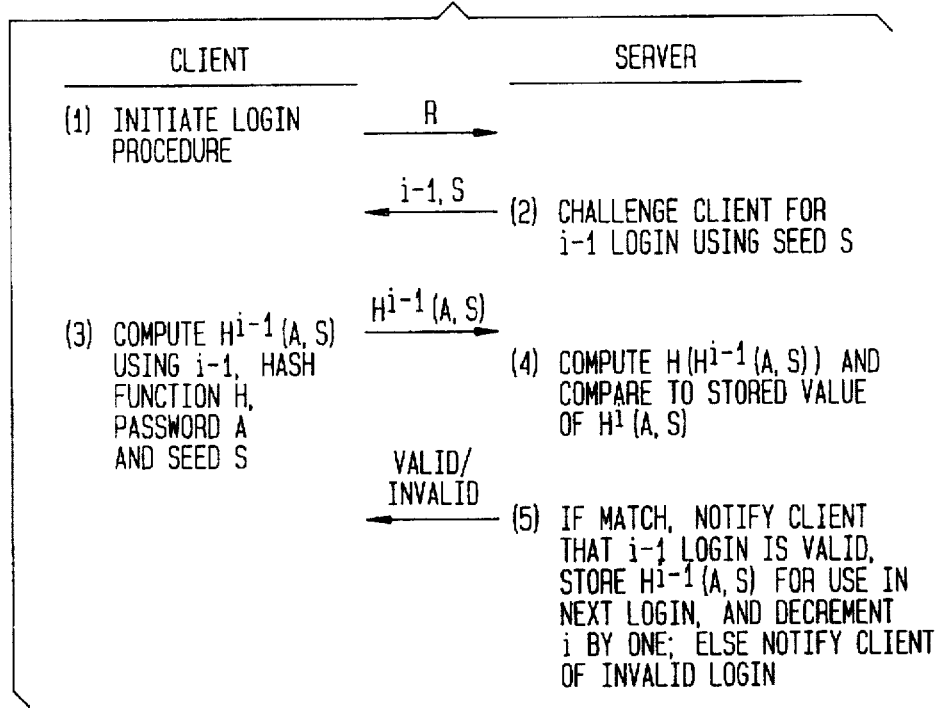
FIG. 1 is a diagram illustrating the operation of a secure password system in accordance with the prior art.

The server in step (2) challenges the client for the i−1 login in the current login series, receives $H^{i-1}(A)$ from the client in response, computes $H(H^{i-1}(A))$ and compares the result to the stored value of $H^i(A)$ generated during the previous valid login. If a match is found, the corresponding user has a valid password, and the values of i−1 and $H^{i-1}(A)$ are stored for use with the next login in the series as was noted in conjunction with FIG. 1 above. With each successive login by the user, the number of hash iterations is reduced by one, until a point is reached when the number of iterations is reduced to zero or below a predetermined minimum. If the server were to eventually request the user to send the result of performing zero iterations of the hash function on the password, this would be the equivalent of requesting the user to send an unencrypted password. The server therefore instead indicates to the client in step (2) that the end of a login series associated with password A has been reached or will be reached soon, and that a new login series based on a new password B and a new number of hash iterations n should be initialized to provide continued password security. It should be noted that the server generally keeps track of the number of valid logins for a given series, because a user may utilize many different clients to login to the server. In alternative embodiments, one or more clients could keep track of the number of logins and determine whether re-initialization is needed, or the server could supply the current login count as part of other communications with the clients.

The client responds in step (3) to a server-supplied or internally-generated re-initialization indication by requesting the new password B from the user, selecting the new starting number of hash iterations n, and computing the value L in accordance with the following equation:

$$L = H^{i-2}(A) \oplus H^n(B)$$

in which $\oplus$ denotes the exclusive-or (XOR) logical operator. It will be assumed without limitation that the hash function results are represented in binary form such that the XOR operation can be readily applied. A number of other functions, including addition, may be applied to generate the L value in alternative embodiments. The value L is also referred to herein as an initialization signal and represents a link between the previous login series based on password A, and the new login series based on password B. As noted in step (3), the client sends both L and n to the server. The server in step (4) stores L and n along with the previously-stored i−1 and $H^{i-1}(A)$ values. The client then executes a logout procedure in step (5), and subsequently initiates a second login procedure in step (6). The server responds in step (7) by challenging the client to provide an encrypted password corresponding to the n−1 login of the new login series. The client computes $H^{n-1}(B)$ in step (8) and sends it to the server. The server in step (9) computes $H(L \oplus H(H^{n-1}(B)))$ and compares the result to the previously stored value of $H^{i-1}(A)$. As noted in step (10), a match indicates that the encrypted password transmitted from the client is valid for the corresponding user, while lack of a match indicates that the encrypted password is invalid. The server notifies the client of the result, and takes appropriate action to either grant or deny access to the user. If the encrypted password is valid, the values $H^{n-1}(B)$ and n−2 are stored for use with the next login of the new series, while the values of L and $H^{i-1}(A)$ may be erased. A number of other functions, including subtraction, may be utilized by the server to process the initialization signal value L and the encrypted password for the current login.

If for some reason the initial login of the new series is unsuccessful, and the previous login series includes a sufficient number of remaining hash iterations, the server may challenge the client to provide the i−2 login of the previous series. In such a case, the client computes $H^{i-2}(A)$ and sends it to the server. The server then computes $H(H^{i-2}(A))$ and compares it with the previously stored value $H^{i-1}(A)$ to determine if the i−2 login based on password A is valid. If the i−2 login is valid, the server may erase L and instead store only the values i−2 and $H^{i-2}(A)$. The server may then continue to use the previous login series based on password A as long as there are a sufficient number of remaining hash function iterations, and attempt another re-initialization later on. This process helps to defeat a denial-of-service type attack on the security of the password system. In a denial-of-service attack, an attacker attempts to deny service to a particular user or client by submitting counterfeit L values to the server. The ability of the client to login using the next value in the previous series based on password A, assuming that one or more hash iterations remain, will ensure that service will not be denied to the client.

Figure 4:
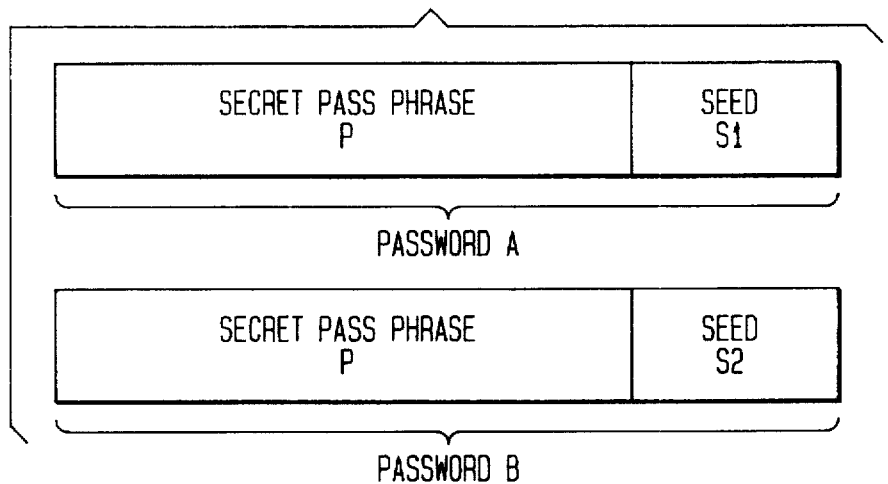
FIG. 4 shows exemplary first and second passwords comprising a common secret pass phrase portion and different seed portions in accordance with the invention.

FIG. 4 illustrates an exemplary format suitable for use with the above-described passwords A and B. Each of the passwords includes a common first portion designated as a secret pass phrase P. The passwords A and B also include different second portions designated as seeds S1 and S2, respectively. The password A in this example represents the concatenation of P and S1 while the password B represents the concatenation of P and S2. The secret pass phrase portions of passwords A and B therefore may be held constant while only the seed portion of password A is altered to provide the new password B in accordance with the above-described re-initialization process.

Another illustrative embodiment of the invention makes use of the password formats of FIG. 4 to further simplify the re-initialization process. The client 12-m in this embodiment is configured to automatically interpret and respond to an indication from the server 14-m that the current login series has reached a certain minimum number of iterations and that re-initialization should be performed with a new seed S2. The client responds by computing a value of L for a new password B which includes the same pass phrase P as the previous password, but the new seed S2 supplied from the server. In this manner, a login series can be re-initialized without requiring the user to provide and memorize a new password or any portion of a new password upon re-initialization. Alternatively, the client may automatically determine the new seed S2 and therefore the new password B instead of receiving the seed S2 from the server. For example, the steps of determining a new seed and computing a corresponding L value could be performed by the client each time the number of logins remaining for a given series reaches a predetermined minimum value. Regardless of whether the new seed S2 is supplied from the server or generated by the client in response to an indication from the server, it will appear to the user that the number of secure logins possible with a single pass phrase is essentially unlimited. The user need not even be aware that the above-described re-initialization process is taking place. As was noted above, the server generally keeps track of the number of remaining logins and the current seed for a given login series on that server. This is because a particular user may login from any of a number of different clients to a number of different servers, such that it may be difficult for any single client to track the number of logins which have been executed in a given login series on a given server. However, alternative embodiments may permit one or more clients to determine whether a re-initialization is needed.

The re-initialization process of the present invention utilizes an initialization signal including a value L which provides a link between a first login series based on one password and a second login series based on a new password. An attacker is generally unable to independently compute a valid L value, because the attacker cannot determine $H^{i-2}(A)$. Although an attacker could eavesdrop on the insecure network connection to obtain a valid L value, the attacker cannot use this L value to login because he is unable to determine $H^{n-1}(B)$. In addition, the invention may be implemented to protect against the denial-of-service type attacks previously described. An attacker cannot deny service to a particular user by submitting counterfeit 1, values to the server, because the client can generally login under the next value in the previous login series, assuming there is at least one remaining hash iteration in that series. A secure password system in accordance with the present invention is thus secure against the most common forms of attack.

The above-described embodiments of the invention are intended to be illustrative only. Numerous alternative embodiments may be devised by those skilled in the art without departing from the scope of the following claims.

What is claimed is:

1. A method of communicating over a transmission medium using an iterated hash function, the method comprising the steps of:

determining that a first series of communications based on a first password has reached a predetermined minimum number of remaining hash function iterations;

generating an initialization signal relating the first series of communications based on the first password to a second series of communications to be based on a second password, wherein the initialization signal is generated as a function of the results of applying a first number of hash function iterations to the first password and a second number of hash function iterations to the second password; and transmitting the initialization signal over the medium prior to commencing the second series of communications.

2. The method of claim 1 wherein the first and second series of communications further include first and second series of logins, respectively, wherein each login in the series is initiated by the user corresponding to the first and second passwords and involves information communicated between a given client and a server over the medium.

3. The method of claim 2 wherein the information transmitted between the given client and the server over the medium further includes:

a login request transmitted by the client to the server;

a designated number of hash function iterations transmitted from the server to the client;

an encrypted password, transmitted from the client to the server, and generated by the client applying the designated number of hash function iterations to the corresponding password; and an indication as to whether or not the login is valid, transmitted from the server to the client, and generated by the server applying at least one hash function iteration to the encrypted password and comparing the result to a previously stored encrypted password transmitted to the server in a previous valid login by the user.

4. The method of claim 1 wherein the step of determining that a first series of communications based on a first password has reached a predetermined minimum number of remaining iterations further includes the step of a client receiving the indication from a server in response to a login request of a given user transmitted from the client to the server.

5. The method of claim 1 wherein the step of generating an initialization signal further includes the step of generating the second password to include first and second portions, wherein one of the first and second portions is the same as a corresponding portion of the first password.

6. The method of claim 1 wherein the step of generating an initialization signal relating the first series of communications based on the first password to the second series of communications based on the second password further includes the step of generating the initialization signal as the exclusive-or of (i) the result of applying the first number of hash function iterations to the first password, and (ii) the result of applying the second number of hash function iterations to the second password.

7. The method of claim 1 wherein the step of generating an initialization signal relating the first series of communications based on the first password to the second series of communications based on the second password further includes the step of generating the second password by combining a portion of the first password with a new seed portion without input from the corresponding user.

8. The method of claim 1 wherein the step of generating an initialization signal relating the first series of communications based on the first password to the second series of communications based on the second password further includes the step of requesting a user to enter at least a portion of the second password.

9. The method of claim 1 further including the step of transmitting another communication in the first series of communications based on the first password, after transmission of the initialization signal but prior to commencement of the second series of communications, if the transmission of the initialization signal results in a server denying access to the corresponding user.

10. An apparatus for communicating over a transmission medium using an iterated hash function, the apparatus comprising:

a processor coupled to the transmission medium to receive therefrom an initialization signal relating a first series of communications based on a first password to a second series of communications to be based on a second password, wherein the initialization signal is generated as a function of the results of applying a first number of hash function iterations to the first password and a second number of hash function iterations to the second password; and a memory coupled to the processor and storing at least a portion of one of the first series of communications, wherein the processor is further operative to subsequently determine if one of the second series of communications is a valid communication by comparing a function of the initialization signal to the stored portion of one of the first series of communications.

11. The apparatus of claim 10 wherein the processor is further operative to provide an indication that a first series of communications based on a first password has reached a predetermined minimum number of remaining hash function iterations, and wherein the indication is supplied over the transmission medium to a client which generates the initialization signal in response to the indication.

12. The apparatus of claim 11 wherein the indication that a first series of communications based on a first password has reached a predetermined minimum number of hash function iterations is provided in response to a login request of a given user supplied over the medium from a client to a server.

13. The apparatus of claim 10 wherein the processor and memory are part of a server which receives the first series of communications from one or more clients over the transmission medium.

14. The apparatus of claim 13 wherein the first and second series of communications further include first and second series of logins, respectively, wherein each login in the series is initiated by a user corresponding to the first and second passwords and involves information communicated between a given client and the server over the transmission medium.

15. The apparatus of claim 14 wherein the information transmitted between the given client and the server over the medium further includes:

a login request transmitted by the client to the server;

a designated number of hash function iterations transmitted from the server to the client;

an encrypted password, transmitted from the client to the server, and generated by the client applying the designated number of hash function iterations to the corresponding password; and an indication as to whether or not the login is valid, transmitted from the server to the client, and generated by the server applying at least one hash function iteration to the encrypted password and comparing the result to a previously stored encrypted password transmitted to the server in a previous valid login by the user.

16. An apparatus for communicating over a transmission medium using an iterated hash function, comprising:

a processor operative to receive an indication that a first series of communications based on a first password has reached a predetermined minimum number of remaining hash function iterations, to generate in response to the indication an initialization signal relating the first series of communications based on the first password to a second series of communications to be based on a second password, wherein the initialization signal is generated as a function of the results of applying a first number of hash function iterations to the first password and a second number of hash function iterations to the second password, and to transmit the initialization signal over the medium prior to commencing the second series of communications.

17. The apparatus of claim 16 wherein the processor is part of a client which receives the indication from a server over the transmission medium.

18. The apparatus of claim 16 wherein the processor is part of a client which generates the indication.

19. The apparatus of claim 16 wherein the first and second series of communications further include first and second series of logins, respectively, wherein each login in the series is initiated by a user corresponding to the first and second passwords and involves information communicated between a given client and the server over the transmission medium.

20. The apparatus of claim 16 wherein the processor is further operative to generate the second password to include first and second portions, wherein one of the first and second portions is the same as a corresponding portion of the first password.

21. The apparatus of claim 16 wherein the processor is further operative to generate the initialization signal as the exclusive-or of (i) the result of applying the first number of hash function iterations to the first password, and (ii) the result of applying the second number of hash function iterations to the second password.

22. The apparatus of claim 16 wherein the processor is further operative to generate the second password by combining a portion of the first password with a new seed portion without input from the corresponding user.

23. The apparatus of claim 16 wherein processor is further operative to generate the second password by requesting a user to enter at least a portion of the second password.

24. The apparatus of claim 16 wherein the processor is further operative to transmit another communication in the first series of communications based on the first password, after transmission of the initialization signal but prior to commencement of the second series of communications, if the transmission of the initialization signal results in a server denying access to the corresponding user.

* * * * *